(12) United States Patent
Kubo et al.

(10) Patent No.: US 7,306,839 B2
(45) Date of Patent: Dec. 11, 2007

(54) MOLDED WEATHER STRIP

(75) Inventors: Yoshihisa Kubo, Aichi (JP); Masahiko Ito, Aichi (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/634,861

(22) Filed: Dec. 7, 2006

(65) Prior Publication Data

US 2007/0077394 A1    Apr. 5, 2007

Related U.S. Application Data

(62) Division of application No. 10/862,886, filed on Jun. 8, 2004, now Pat. No. 7,175,797.

(30) Foreign Application Priority Data

Jun. 10, 2003  (JP)  ............................. 2003-164598
Dec. 26, 2003  (JP)  ............................. 2003-433457

(51) Int. Cl.
  *B60J 10/08*    (2006.01)
  *B60J 10/00*    (2006.01)
(52) U.S. Cl. ..................... 428/122; 428/136; 49/479.1; 49/498.1
(58) Field of Classification Search ................ 428/122, 428/136; 49/479.1, 498.1, 475.1
See application file for complete search history.

(56) References Cited

U.S. PATENT DOCUMENTS

| 4,769,947 | A | 9/1988 | Ogawa et al. |
| 5,258,157 | A | 11/1993 | Nozaki et al. |
| 5,269,101 | A | 12/1993 | Nozaki et al. |
| 6,395,355 | B1 | 5/2002 | Nakajima et al. |
| 6,598,347 | B2 | 7/2003 | Hattori |

FOREIGN PATENT DOCUMENTS

| GB | 2329 143 A | 3/1999 |
| JP | A-58-205749 | 11/1983 |
| JP | A-4-131209 | 5/1992 |

*Primary Examiner*—Alexander S. Thomas
(74) *Attorney, Agent, or Firm*—Posz Law Group, PLC

(57) ABSTRACT

The core mold in the molding device (51) for forming the molded member (4) of the weather strip (1) is provided with a center core (61) having a center core body (63), and a side core (62) having a pair of side core bodies (66L, 66R) The base bottom portion (21) of the molded member (4) is made so that a center slit (33) having substantially an H-shape, a pair of slide slits (32L, 32R), and slit-less bridge portion (34). In order to open the molds, the side core (62) is slid, and the center core body (63) is thereby separated from the side core bodies (66L, 66R). The center core body (63) is thereby withdrawn from the weather strip (1), and the side core bodies (66L, 66R) thereafter are withdrawn.

5 Claims, 9 Drawing Sheets

MOLDED WEATHER STRIP

The present application is a division of U.S. application Ser. No. 10/862,886 filed on Jun. 8, 2004 now U.S. Pat. No. 7,175,797, which is based on Japanese Patent Applications Nos. 2003-164598 and 2003-433457, which are incorporated herein by reference.

BACKGROUND OF THE INVENTION

1. Field of the Invention

The present invention relates to a weather strip, a method of manufacturing the same, and a molding device used in the same method.

2. Related Art

The manufacturing of a related art weather strip of this kind has been done by a known extrusion molding method in which an extruded member is formed in an elongated state. A molded member is then formed in a continuously connected state with respect to an end surface of the extruded member with a front section of the extruded member set in a molding device used to form the molded member.

The molding device used to continuously form the molded member includes a fixed mold, a plurality of movable molds and core molds. The core molds include core bodies for forming hollow portion, and core-extended plates extending from the core bodies. In order to form a molded member, an extruded member formed in advance by a known extrusion molding method is set first with each mold opened, in such a manner that an end portion of the extruded member is fitted in an end portion of the core body, the extruded member being thus fixed in the molding device. Next, each mold is disposed in a predetermined position, and the molding device is closed. At this point in time, molded member forming cavities are formed by the molds. Unvulcanized rubber is then injected into the cavities via a gate (not shown) and the like so as to fill the cavities therewith. The unvulcanized rubber is thereafter vulcanized. Each mold is opened, and core molds and vulcanized rubber (precursor of a molded member) combined together are removed. At this time, slits are formed in the precursor of the molded member owing to the existence of the core-extended plates.

When the core bodies are taken out from the slits, a hollow-carrying precursor of the molded member is obtained. The opposed openings of the slits are then joined together at a plurality of positions with an adhesive to obtain a molded member. In short, a weather strip in which this molded member and extruded member are combined together is obtained (refer to, for example, Japanese unexamined Patent Publication No. JP-S58-205749A).

In order to try to form the hollow portion in the whole longitudinal region of the molded member, the core body is necessarily provided over the whole longitudinal region of the molded member. When the easiness of the withdrawal of the core body is taken into consideration, it is desirable that the slits be also formed in substantially the whole longitudinal region of the molded member.

However, the slit becomes long in this case, so that it becomes necessary in many positions to bond the slit defining portions together after the core bodies are taken out. This causes the possibility that the operation man-hour and manufacturing cost necessarily increase to arise.

Since the slits are closed with an adhesive, the molded member is necessarily deformed in its width reducing direction. Therefore, it is necessary to design a product and molds with a deformation margin of the molded member estimated, and there is the possibility that this increases complexity and man-hour of the designing operation.

SUMMARY OF THE INVENTION

The present invention has been made so as to solve these problems, and an object of the invention is to provide a weather strip having a molded member and capable of suppressing an increase in the man-hour of the weather strip manufacturing operation, the man-hour of the product and mold designing operation, and the weather strip manufacturing cost, and, moreover, a weather strip capable of greatly improving the work efficiency; a method of manufacturing the same; and a molding device used to practice the same method.

The means suitable to attain the above object will now be itemized and described. The operation and effects peculiar to the respective means will be added as necessary.

(1) The invention provides a method of manufacturing weather strips, adapted to manufacture a weather strip having a molded member which is provided with a base bottom portion, and a seal portion projecting from the base bottom portion and forming a hollow portion therein, a cavity being formed by a molding device in which at least a core mold for forming a hollow portion is provided, an elastic material in a plasticized state being injected into the cavity, the cavity being thus filled with this material, the same material being then solidified, at least three longitudinally extending slits, and bridge portion formed between the slits being formed in consequence in and on the base bottom portion, the molding device being opened, the core mold being removed from the three slits to obtain the molded member in which the hollow portion is formed, characterized in that the core mold is provided with a center core having a center core body, and a center extension plate extending from the center core body, and side cores having a pair of side core bodies connected to the portions of the center core which are longitudinally on both sides of the weather strip, and side extension plates extending from the side core bodies, the three slits including a center slit for withdrawing the center body therefrom, and a pair of side slits for withdrawing the side core bodies therefrom, the center slit including a first slit part the length of which is equal to or substantially equal to that in the longitudinal direction of the weather strip of the center core body, and second slit parts extending in the direction in which the second slit parts intersect with the first slit part, the core mold removing operation being carried out by extracting the center core body from the center slit, and thereafter withdrawing the side core bodies from the side slits.

According to the invention, the core mold is divided into a center core and a pair of side cores, so that the slits formed by the core mold become short divided slits, this enabling bridge portion to be formed among the slits. Therefore, unlike a related art weather strip in which the slit-defining portions have to be closed and bonded together after a die forming operation is carried out, the weather strip according to the present invention does not have to carry out a bonding operation owing to the existence of the bridge portion. Moreover, it is not necessary in a designing operation to estimate the size of a deformation margin for closing the slit-defining portions. Therefore, it is possible to hold down an increase in the designing man-hour and operation man-hour, and an increase in the manufacturing cost. Furthermore, since the slits are formed in the base bottom portion unlike the case where the slits are formed in a seal portion, the spoiling of the rigidity of the seal portion and a decrease in the sealability thereof due to the slits can be prevented. Also, the second slit parts are provided in the center slit, the first slit part can be opened greatly with ease in the widthwise direction thereof. Accordingly, the withdrawing of the center core body when the core mold is released can be carried out easily. In addition, when the center core is taken out first, a part of the weather strip is unfixed. Therefore, when the side core bodies are withdrawn, the weather strip is deformed and relatively moved easily with respect to the side core bodies, and the withdrawing of the side core bodies can also be done easily. For example, when the molding device is formed so that the center core body only is withdrawn automatically at the time of opening of the mold, the core metal removing operation to be thereafter carried out includes only a side core body withdrawing operation. The side core body withdrawing operation can also be carried out easily. As a result, the work efficiency can be greatly improved.

(2) In the invention, the two side extension plates constituting the side core may be joined together by a connecting portion, the core mold removing operation being carried out by sliding the side cores in the side extension plate extending direction, the side core bodies being thereby separated relatively from the center core body, which is thereby withdrawn from the hollow portion of the molded body.

According to the above construction, the side cores are slid only, and the center core body is separated relatively from a position between the side core bodies. During this time, the molded member is slid with the side core bodies, so that the center core body is necessarily withdrawn comparatively easily. Moreover, since the two side extension plates are joined together in one body by the connecting portion, the withdrawal of the center core body is completed by one sliding operation. This enables the work efficiency to be further improved.

(3) In the invention, each of the side slits may include a main slit part formed by the side extension plates, and extension slit parts provided so as to extend from ends of the main slit part in the longitudinal direction of the weather strip and formed by a mold part different from the side extension plates.

According to the above construction, the side slits have extension slit parts, and the length of the extension slit parts are therefore larger than that of the main slit part formed by the side extension plates. Accordingly, in order to withdraw the side core bodies from the above-mentioned slits, the side extension plates are moved toward one end in the side slits even though the total length of the side slits is smaller than the length with respect to the longitudinal direction of the weather strip of the side core bodies, and the end portions of the side core bodies are withdrawn from the other end in the side slits. This enables the side core bodies to be withdrawn easily.

(4) In the invention, the mold part for forming the extension slit parts may be also separated relatively from the side core bodies at the same time that the center core body is separated relatively from the side core bodies and withdrawn when the molding device is opened.

According to the above construction, the relative separation of the center core body and side core bodies from each other and the relative separation of the mold part for forming the extension slit parts and side core bodies from each other are carried out at once, so that the work efficiency can be improved. When the two relative separation operations are carried out simultaneously by sliding the side cores connected together in one body, the work efficiency can further be improved.

(5) In the invention, the extension slit parts of the side slits may be formed on both ends of the main slit, a molded body being set relatively movable when the side core bodies are withdrawn from the side slits, in such a manner that the side extension plates are made to be put into the one end side core-extended slit part.

According to the above construction, the extension slit parts of the side slits are formed at both ends of the main slit part. Therefore, when a molded body is moved with respect to the side cores after the center core body is withdrawn from the molded member, both of the side extension plates smoothly enter the interior of the extension slit parts on one side in the two side slits. When the end portions of the side core bodies are then withdrawn from the other end sides of the side slits, the side core bodies can be withdrawn easily from the side slits.

(6) In the invention, the center slit may be formed by the center extension plate.

According to the above construction, the center slit is formed by the center extension plate. Namely, another mold is not needed to form the center slit. Therefore, in order to withdraw the center core body, it is unnecessary to separate an additional mold therefrom since the center slit is formed in advance. The center core body can be withdrawn by only moving the center core with respect to the molded member.

(7) In the invention, the second slit parts of the center slit may be formed substantially at both end portions of the first slit part thereof so as to intersect with the first slit part at right angles thereto or at substantially right angles thereto, and so as to have a length substantially equal to the width of the surface of the center core body which is on the side of the base bottom portion.

According to the above construction, the second slit parts of the center slit are formed substantially at both end portions of the first slit part thereof so as to intersect with the first slit part at right angles thereto or at substantially right angles thereto. Therefore, the opening of the center slit can be opened substantially rectangularly. In addition, the second slit parts are formed so as to have a length substantially equal to the width of the surface of the center core body which is on the side of the base bottom portion. This enables the center slit to be opened sufficiently greatly with respect to the center core body. Accordingly, the withdrawing of the center core body can be done more easily.

(8) In the invention, the molded member may be a member fitted in a corner portion of a door sash, the not smaller than three slits being formed in one side of the corner portion, in an angular section of the corner portion, and in the section of the base bottom portion which correspond to the other side of the corner portion.

According to the above construction, the not smaller than three slits are formed in one side of a corner portion of a door sash, in an angular section of the corner portion, and in the section of the base bottom portion which correspond to the other side of the corner portion. Even when the molded member is fitted in the corner portion, the shape follow-up characteristics of the weather strip can be improved owing to the existence of the slits formed in the corner portion of the sash.

(9) In the invention, the molded member may be made so that the molded member connects both ends of the extruded member, which is formed separately therefrom, together or respective ends of a plurality of extruded members together.

According to the above construction, the core mold can be removed easily even when the molded member is made so that the end portions of the extruded member, which is formed separately therefrom, are connected together.

(10) In the invention, the molded member may be formed so as to be connected to one end of the separately formed extruded member.

According to the above structure, the core mold can be removed easily even when the molded member is formed so as to be connected to one end of the extruded member formed separately therefrom.

(11) A weather strip provided with a molded member having a base bottom portion, and a seal portion projecting from the base bottom portion and forming a hollow portion therein, characterized in that the base bottom portion of the molded member is provided with three longitudinally extending slits including a center slit, and two side slits made on both sides of the center slit, bridge portion being formed among these slits, the center slit being provided with a first slit part, and second slit parts formed substantially at both ends of the first slit part so that the second slit parts intersect with the first slit part.

According to the above construction, the center slit is provided with second slit parts, so that the first slit part can be opened greatly in the widthwise direction thereof with ease. The rigidity of the portion of the base bottom portion in which the center slit is formed becomes lower than that of the portion thereof in which the side slits are formed but an extremely large decrease in the rigidity of the former portion of the base bottom portion can be held down owing to the existence of the bridge portion. This enables the shape follow-up characteristics of the weather strip with respect to a weather strip fixing operation to be improved. Furthermore, unlike a related art weather strip in which the slits have to be closed and bonded after a molding operation finishes, the weather strip according to the present invention does not need to be subjected to a slit bonding operation. Nor is it necessary when the weather strip is designed, to estimate the sizes of a deformation margin for closing the slits. Therefore, an increase in the operation man-hour, designing man-hour and manufacturing cost can be held down. As a result, the work efficiency can be greatly improved.

(12) In the invention, the molded member may have a curved shape so that the molded member is fitted in an opening portion of a vehicle or fitted in a corner portion of a circumference of a door, the center slit as a whole being formed substantially in the H-shape or substantially in the U-shape since the second slit parts are formed so as to intersect with the first slit part at right angles thereto or at substantially right angles thereto.

According to the above construction, the molded member has a curved shape, so that the weather strip has excellent shape follow-up characteristics with respect to the operation for fixing the weather strip to an opening of a vehicle and a corner portion of a circumference of a door. The center slit as a whole is formed substantially in the H-shape or substantially in the U-shape. When the center slit is formed substantially in the H-shape, the stress concentration in the widthwise direction of the weather strip can be prevented. When the center slit is formed substantially in the U-shape, the rigidity of the seal portion of the weather strip or that of the portion of the weather strip which is on the widthwise opposite side of the seal portion can be secured by conversely concentrate stress in either of two widthwise directions.

(13) In the invention, the molded member may be formed substantially linearly, the center slit as a whole being formed substantially in the H-shape or substantially in the U-shape since the second slit parts are formed so as to intersect with the first slit part at right angles thereto or at substantially right angles thereto.

According to the above construction, the center slit displays the same operation and effects as that in (12). In addition, the molded member is shaped substantially linearly, so that the weather strip is suitable to be fixed to a substantially linear portion of an opening of a vehicle and a circumference of a door.

(14) In the invention, both ends of one extruded member or respective end portions of a plurality of extruded members, which are formed separately from the molded member, may be connected to both sides of the molded member.

According to the above construction, the operation and effects described in the above (11) to (13) are displayed even when the end portions of an extruded member, which is formed separately from the molded member are connected to both sides of the molded member.

(15) In the invention, the molded member may be connected to the end portion of the extruded member, which is formed separately from the molded member, to form a terminal portion of the weather strip.

According to the above construction, the operation and effects described in (11) to (13) are displayed even when the molded member constitutes the terminal portion of the weather strip.

(16) The invention provides a molding device in which at least a core mold of a weather strip for forming molded members, each of which is provided with a base bottom portion, and a seal portion projecting from the base bottom portion and forming a hollow portion therein are installed, the core mold being provided with a center core having a center core body for forming the hollow portion, and a center extension plate extending from the center core for forming a center slit in the base bottom portion, and a side core provided with a pair of side core bodies, which are connected to both sides in the longitudinal direction of the weather strip of the hollow-forming center core, side extension plates extending from the side core bodies for forming side slits in the base bottom portion, and a side core having a connecting portion for connecting the side extension plates together, the center extension plate being provided at the portions thereof which are at both ends thereof in the longitudinal direction of the weather strip, and which contact the center core body, with a transverse piece portion extending in the direction in which the transverse piece portion intersects the center extension plate.

According to the above construction, the core mold is divided into a center core, and a pair of side cores, and each slit formed by the core mold therefore becomes a short divided slits, this enabling bridge portion to be formed among the slits. Therefore, unlike a related art weather strip in which slits have to be closed and bonded together after a die forming operation finishes, the weather strip according to the present invention does not need to carry out a bonding operation owing to the existence of the bridge portion. Moreover, when the mold is designed, it is not necessary to estimate the sizes of a deformation margin for closing the slits. Accordingly, an increase in the operation man-hour, designing man-hour and manufacturing cost can be held down. Furthermore, since the center extension plate is provided with a transverse piece portion, second slit parts extending in the direction in which the second slit parts intersect with the first slit part owing to the transverse piece portion are formed, and the center slit can be opened widthwise greatly with ease. Therefore, when the core mold is removed, the withdrawal of the center core body can be carried out easily. For example, when the easily removable center core is taken out first, a part of the weather strip is unfixed. At the time of the withdrawal of the side core bodies to be carried out thereafter, a deformation movement of the weather strip with respect to the side core bodies is made easily, and the withdrawal of the side core bodies can also be done easily. When the mold is formed so that the center core only is withdrawn automatically from the hollow portion in accordance with the mold opening operation, a core mold withdrawing operation to be thereafter carried out may be executed by the step of withdrawing side core bodies only. This operation can also be carried out easily. As a result, the work efficiency can be improved greatly.

(17) In the invention, the molding device may be provided with end portions in the longitudinal direction of the weather strip of the side extension plates, and projections for elongating the side slits so that the projections come into close contact with the side core bodies, the projections being provided in a mold part different from the side cores.

According to the above construction, the side slits are formed longer owing to the projections than the slits formed by the side extension plates. When the projections are separated relatively from the side core bodies in advance, the movement of the side cores with respect to the longitudinal direction of the weather strip is made easily. Therefore, in order to withdraw the side core bodies from the side slits, the side extension plates are brought close to one end side in the interior of the side slits even though the total length of the side slits is smaller than the length in the longitudinal direction of the weather strip of the side core bodies, and the end portions of the side core bodies are withdrawn from the other end side in the interior of the side slits. This enables the side core bodies to be withdrawn easily.

DETAILED DESCRIPTION OF THE PREFERRED EMBODIMENTS

First Embodiment

Figure 2:
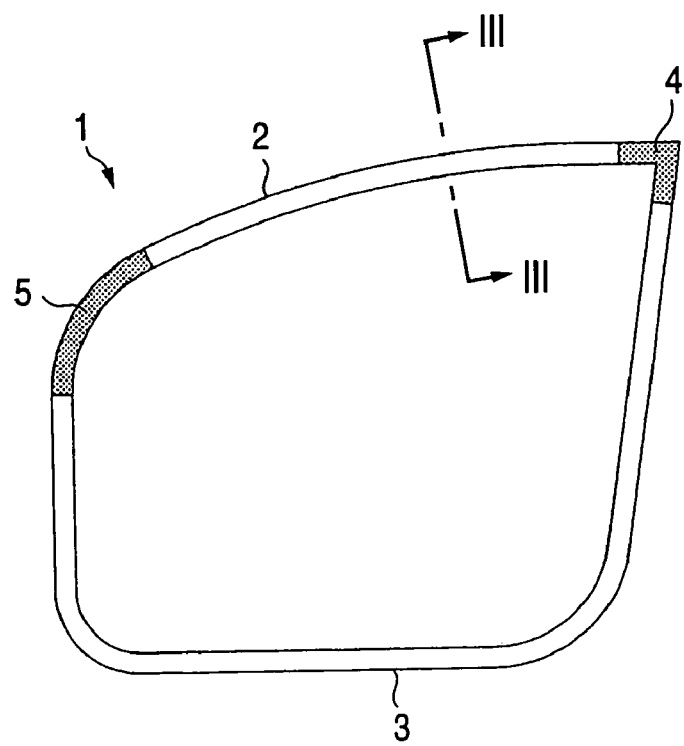
FIG. 2 is a schematic drawing describing a schematic construction of the weather strip in the first embodiment.

A first embodiment will now be described with reference to the drawings. As shown in FIG. 2, a door weather strip (which will hereinafter be referred to simply as "weather strip") 1 formed out of EPDM (ethylene-propylene-diene copolymer rubber), or TPO (olefin-based plastic elastomer) and the like is fixed to, for example, an automobile door so that the weather strip extends along an outer circumference of the door.

This weather strip 1 is provided with extruded members 2, 3 and molded members (portions having dotted patterns shown in the same drawing) 4, 5. The extruded members 2, 3 are formed substantially linearly (in an elongated manner). The molded members 4, 5 are formed by a predetermined molding device so that the molded members connect the end portions of the adjacent extruded members.

Figure 3:
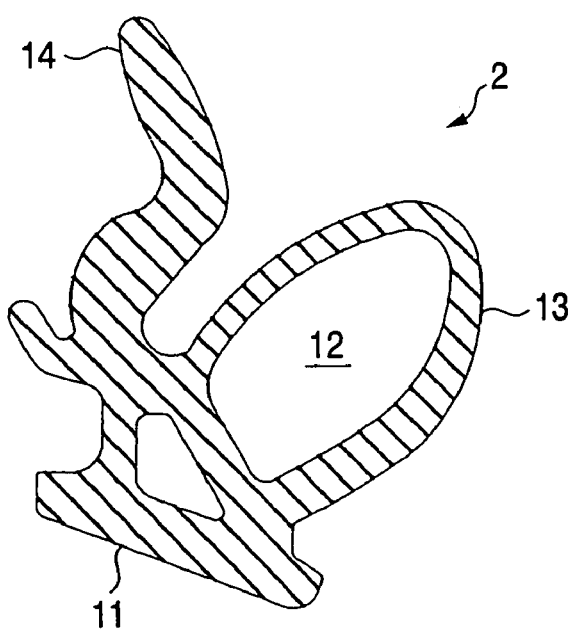
FIG. 3 is a sectional view taken along the line III-III in FIG. 2 and showing an extruded member.

As shown in FIG. 3, the extruded members 2, 3 have a base bottom portion 11 fixed to a sash (not shown) of an automobile door, a seal portion 13 extending from the base bottom portion 11 and having a hollow portion 12 therein, a lip 14 extending from a base end section of the seal portion 13, and the like.

Figure 4:
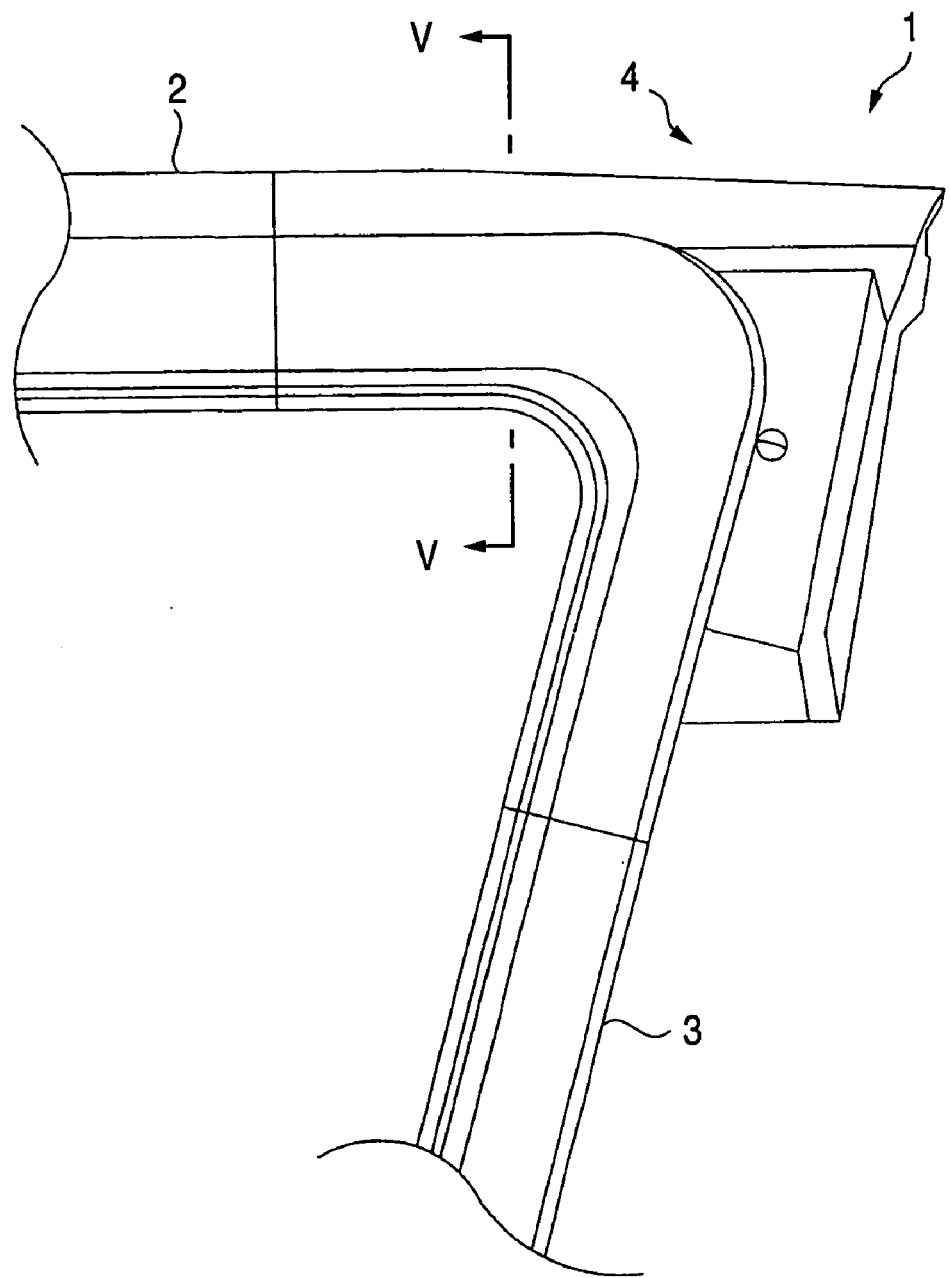
FIG. 4 is a drawing for describing the molded member corresponding to an upper corner portion of the first embodiment.
Figure 5:
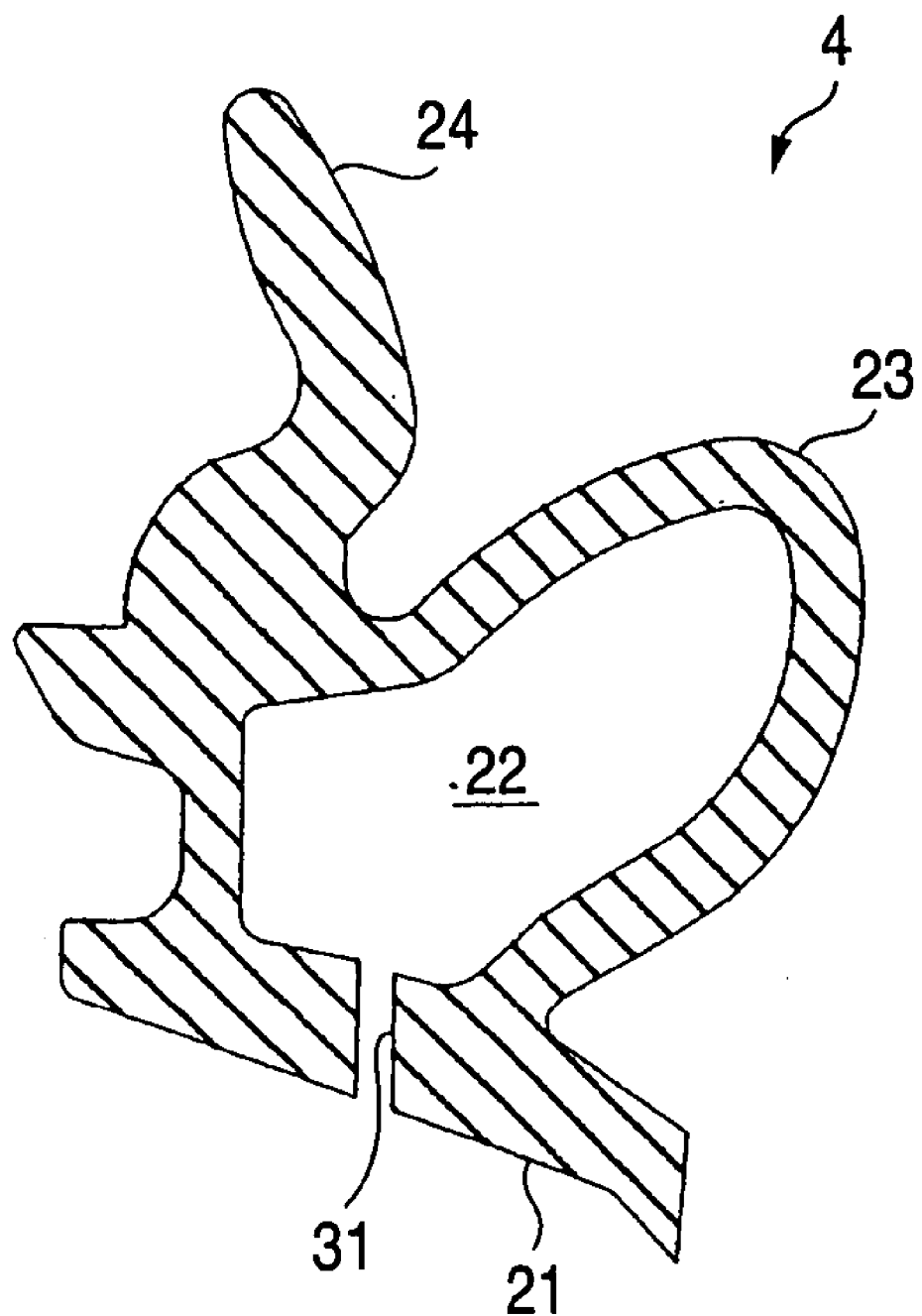
FIG. 5 is a sectional view taken along the line V-V in FIG. 4 and showing the molded member.
Figure 6:
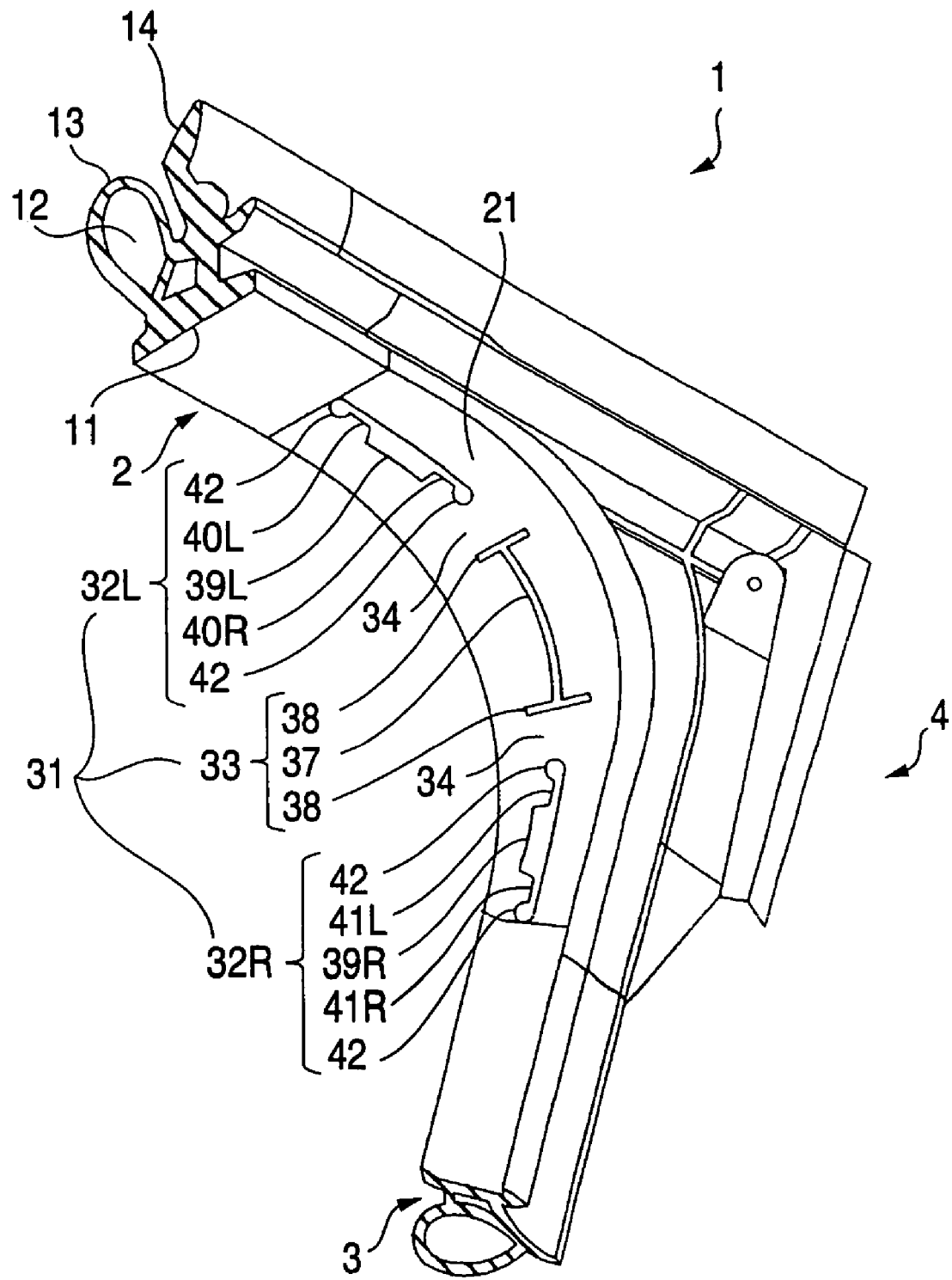
FIG. 6 is a drawing for describing the molded member viewed from the side of a fixing surface of the weather strip of the first-embodiment.

As shown in FIGS. 4 and 5, the molded members 4, 5 also have a base bottom portion 21, a hollow portion 22, a seal portion 23, and a lip 24 just as the extruded members 2, 3, though the shapes of these parts of the molded members and molded members are different from each other. In this embodiment, the molded member 4 corresponding to an upper corner portion of the weather strip is provided as shown in FIG. 6 in a base bottom portion 21 thereof with a slit 31 for the withdrawal of core mold, which will be described later.

In this embodiment, the slit 31 includes two side slits 32L, 32R, and a center slit 33 provided therebetween. These slits 32L, 32R, 33 are formed in substantially the whole region in the longitudinal direction of the weather strip 1 of the molded member 4 so that the slits extend on substantially the same line. Between the side slits 32L, 32R and center slit 33, non-slit-carrying bridge portion 34 are provided.

The center slit 33 is provided with a long slit part 37 as a first slit part extending in the longitudinal direction of the weather strip 1, and short slit parts 38 as second slit parts formed at both ends of the long slit part and extending in the widthwise direction (direction crossing the long slit part 37 at right angles thereof) of the weather strip 1. The center slit as a whole is formed substantially in the H-shape. The length of the short slit parts 38 is set substantially equal to the width of the surface for forming the hollow portion 22 in the base bottom portion 21. The short slit parts 38 may, of course, be formed to the very limit width between both sides of the base bottom portion 21, i.e., to the greatest possible length. The center slit 33 may not necessarily be formed substantially in the H-shape, and this slit may also be formed substantially in the U-shape. Namely, the long slit part 37 may be formed in the substantially central portion in the widthwise direction of the weather strip of the base bottom portion 21, or in the section of the base bottom portion which is offset to one side thereof in the widthwise direction of the weather strip.

The side slits 32L, 32R are provided with main slit parts 39L, 39R extending in the longitudinal direction of the weather strip 1, and extension slit parts 40L, 40R, 41L, 41R which extend from both ends of the main slit parts by a predetermined length in the longitudinal direction of the weather strip, and which are narrower than the main slit parts 39L, 39R. The extension slit parts 40L, 40R, 41L, 41R are provided at the end side sections thereof with substantially circular slit end portions 42 for preventing the occurrence of cracks.

Figure 7:
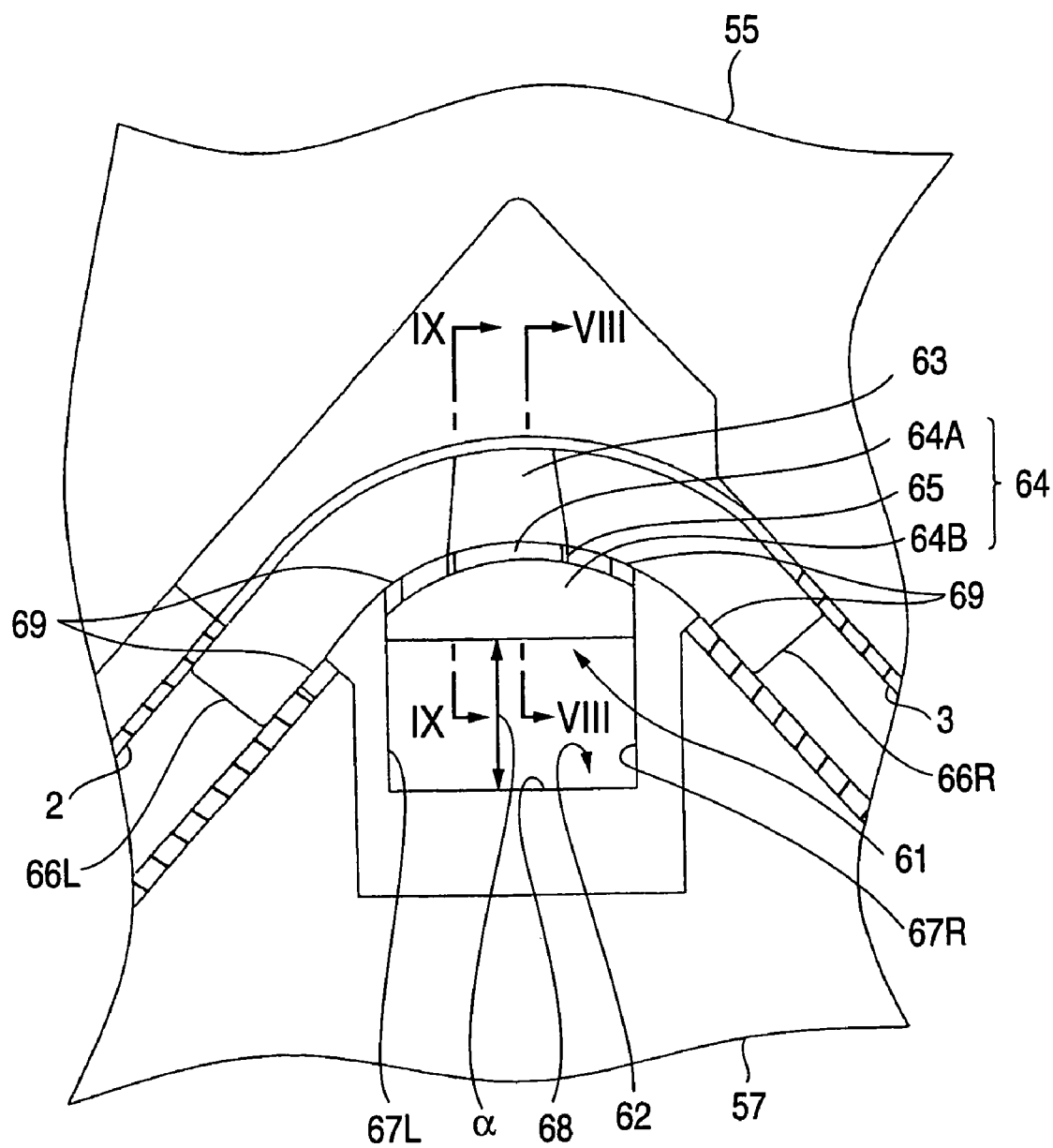
FIG. 7 is a drawing showing a molding device for forming the molded member in the first embodiment.
Figure 8:
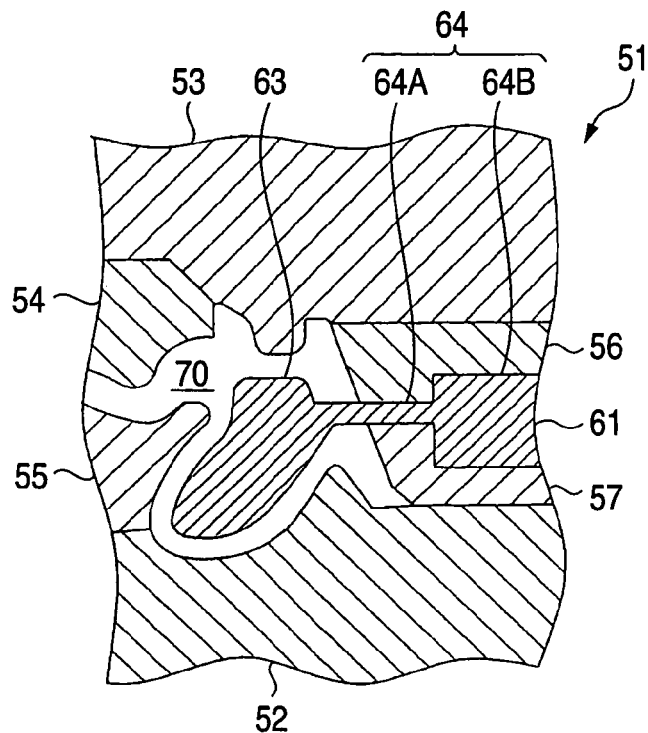
FIG. 8 is a sectional view taken along the line VIII-VIII in FIG. 7 and describing the molding device and a center core.
Figure 9:
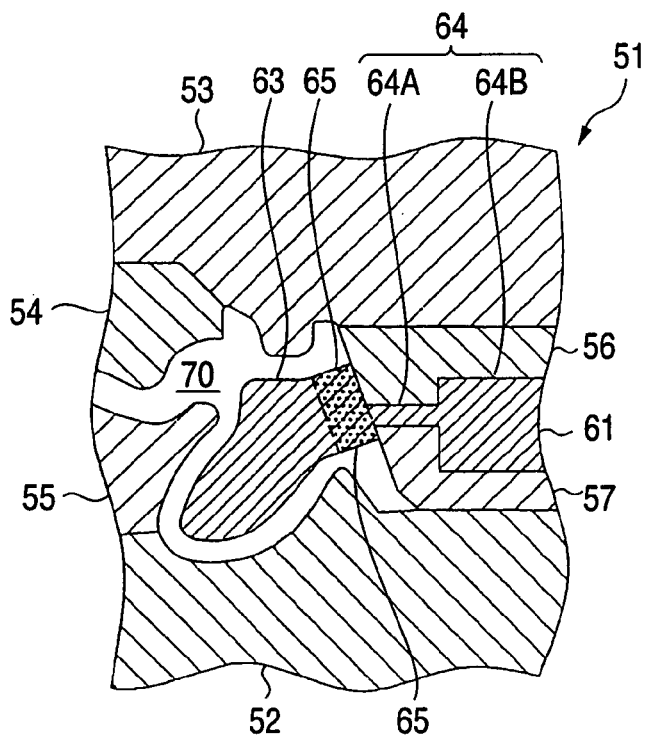
FIG. 9 is a sectional view taken along the line IX-IX in FIG. 7 and describing the molding device and an orthogonal transverse piece portion of the center core.

A molding device 51 for forming the molded member 4 corresponding to the upper corner portion of the weather strip 1 will now be described. FIGS. 7, 8, 9 are sectional views showing the molding device 51 used to form the molded member 4. The molding device 51 is provided, for example, a lower mold 52 positioned on the lower side of FIGS. 8 and 9, an upper mold 53 positioned on the upper side of FIGS. 8 and 9, an outside upper inner-mold 54 and an outside lower inner-mold 55 which are positioned on the outer side of the upper corner portion, and an inside upper inner-mold 56 and an inside lower inner-mold 57 which are positioned on the inner side of the upper corner portion. Between the inside upper inner-mold 56 and inside lower inner-mold 57, a core mold is provided. The core mold includes (refer to FIG. 7) a center core 61 for use in forming a substantially central hollow portion of the upper corner portion corresponding to the molded member 4, and a side core 62 for use in forming a hollow portion continuing to both sides of the center core.

The center core 61 includes a center core body 63, and a center extension plate 64 extending from the center core body in one body, and is held between the inside upper inner-mold 56 and inside lower inner-mold 57. The center extension plate 64 includes a thin portion 64A, and a thick portion 64B extending from the thin portion 64A in the inward direction. The center core body 63 diverges in plan toward the thin portion 64A of the center extension plate 64 and also in the longitudinal direction of the weather strip 1 as shown in FIG. 7. The length in the longitudinal direction of the weather strip of the center core body 63 is set substantially equal to that of the thin portion 64A. At both ends of the thin portions 64A, orthogonal transverse piece portions as transverse piece portions for forming the short slit parts 38 are formed so as to become integral with the thin portions. The height of the orthogonal transverse piece portions (having a dotted pattern shown in FIG. 9 is set substantially equal to the width of the surface of the center core body 63 which is on the side of the base bottom portion 21.

As shown in FIG. 7, the side core 62 includes two side core bodies 66L, 66R, and side extension plates 67L, 67R extending from the side core bodies 66L, 66R in an integral state with respect thereto. The length in the longitudinal direction of the weather strip 1 of the portions of the side extension plates 67L, 67R which are connected to the side core bodies 66L, 66R is set shorter than that in the longitudinal direction of the weather strip 1 of the side bodies 66L, 66R. The side extension plates 67L, 67R are joined together substantially in the U-shape by a connecting portion 68 in one body. The side extension plates 67L, 67R are formed so that the side extension plates can be slid between the inside upper inner-mold 56 and inside lower inner-mold 57 by a predetermined stroke a in the vertical direction in FIG. 7.

At a free end of the inside lower inner-mold 57, projections 69 for forming the extension slit parts 40L, 40R, 41L, 41R are formed in one body. The projections 69 adjoin the edges of the side extension plates 67L, 67R when the molds 52 to 57, 61, 62 are in a set condition. Since the projections 69 do not need to support the core at the free ends thereof unlike the side extension plates 67L, 67R, the thickness of the projections is set comparatively small.

The molds 52 to 57 are provided with molding surfaces extending in conformity with an outer surface of the molded member 4. The center core body 63 and side core bodies 66L, 66R are set in the central portion of a space surrounded by the molds 52 to 57. These molding surfaces, i.e. outer surfaces of the center core body 63 and side core bodies 66L, 66R form a cavity 70 for molding the molded member 4.

The method of manufacturing the weather strip 1 having the above-described construction, and the operation and effect obtained during the manufacturing thereof will now be described. First, the above-mentioned extruded members 2, 3 are obtained by using an extrusion molding machine (not shown) and by a known extrusion molding method. Owing to this molding operation, the base bottom portion 11, seal portion 13, hollow portion 12 and lip 14 of each of the extruded members 2, 3 are formed.

The molded member 4 is obtained in the following manner. First, the end portions of the extruded members 2, 3 are fitted by a predetermined length in the longitudinal end portions of the side core bodies 66L, 66R which do not face the center core 61 with all the molds 52 to 57 opened. The molds 52 to 57, center core 61 and side core 62 are set in predetermined positions, and closed (refer to FIG. 7). As a result, the extruded members 2, 3 are fixed with respect to the molding device 51, and the cavity 70 is formed. The length of the fitting portions of the side core bodies 66L, 66R is set slightly smaller than that of the extension slit parts 40L, 40R, 41L, 41R.

Figure 1:
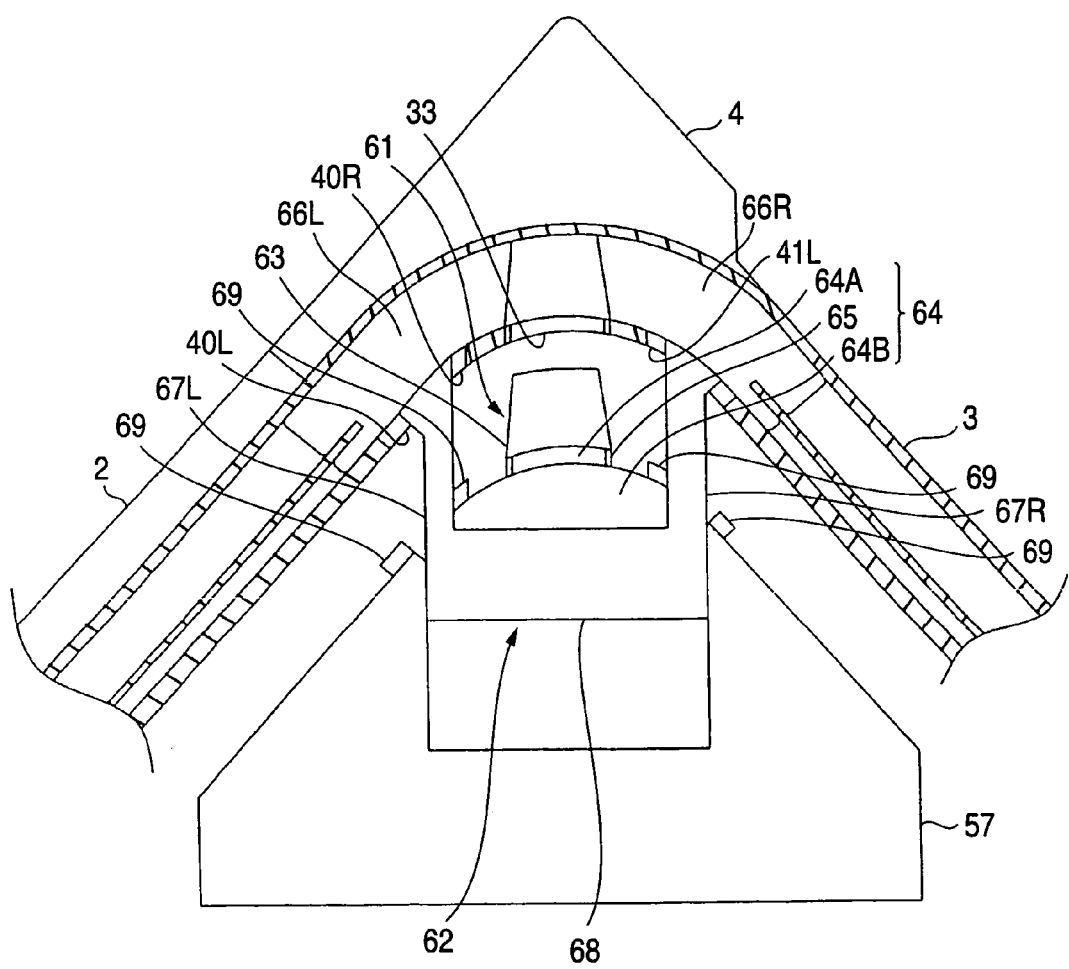
FIG. 1 is a drawing for describing the removal of the weather strip from the core mold in the first embodiment.

The EPDM rubber or the like in a plasticized state is then injected with the molds in this condition from a gate (not shown) into the cavity 70 to fill the same therewith. The EPDM rubber is thereafter vulcanized and solidified. After the solidifying operation is completed, the molds are opened in order. First, the lower mold 52, upper mold 53, outside upper inner-mold 54 and outside lower inner-mold 55 are separated from the molded weather strip 1. Next, the side core 62 is slid (upward in the drawing) with the weather strip 1 with respect to the inside upper inner-mold 56 and inside lower inner-mold 57 as shown in FIG. 1. As a result, the weather strip 1 is separated from the inside upper inner-mold 5 and inside lower inner-mold 57, and the center core body 63 in the hollow portion is removed automatically and easily from the center slit 33. During this time, the projections 69 of the inside lower inner-mold 57 are also separated from the weather strip 1, so that clearances due to the extension slit parts 40L, 40R, 41L, 41R are formed in the weather strip 1.

An operation for removing the molded member 4 from the side core bodies 66L, 66R is carried out by a worker. First, for example, the portion of the left side (in the drawing) extruded member 2 which is in the vicinity of a joint portion thereof with respect to the molded member 4 is drawn in the longitudinal direction of the left side core body 66L toward the left lower side, i.e., in the direction in which the mentioned portion of the extruded member is separated from the side core body 66L. As a result, the weather strip 1 is slid easily with respect to the side core 62, and the side extension plate 67L enters the right extension slit part 40R. Owing to this operation, a left end of the left side core body 66L comes to exist in a position slightly on the right side a left end of the left side slit 32L. Therefore, when the pulled extruded member 2 is then drawn upward in the drawing, the left end of the left side core body 66L slips out easily from the side slit 32L. When the weather strip 1 is then slid rightward with respect to the side core body 66 and thereafter drawn upward in the drawing, the left side core body 66L slips out completely from the weather strip 1. The right side core body 66R is then removed from the weather strip 1 in the same order as the left side core body 66L.

According to this embodiment described in detail above, the core mold is divided into a center core 61 and two side cores 62. Therefore, the slits 32L, 32R, 33 become shorter, and slit-less portions (bridge portion 34) can be formed on the weather strip 1. Accordingly, unlike a related art weather strip in which slits have to be closed and bonded together after a die forming operation is carried out, a bonding operation is not needed. Moreover, it is not necessary to estimate during a designing operation the sizes of a deformation margin for closing the slits. This enables an increase in the operation man-hour, designing man-hour and manufacturing cost to be held down.

A fear of an increase in the deformation of the molded member 4 tends to increase in proportion to the width of the formed slit 31. However, since the width of the extension slit parts 40L, 40R, 41L, 41R is small, the suppression of the deformation of the weather strip can be effected.

Since the center slit 33 is provided with short slit parts 38, the long slit part 37 can be opened greatly in the widthwise direction with ease. Moreover, the center core body 63 is tapered. Therefore, the center core body 63 can be withdrawn very easily from the molded member 4 by a simple operation in which the side core 62 is slid. In addition, since the center core body 63 is tapered, the inconvenience of interfering thereof with the side core bodies 66L, 66R to cause the same to be damaged rarely occurs when the molding device 51 is closed. Moreover, the wear on the center core body rarely occurs. As a result, the molding device 51 can be used stably for a long period of time.

When the center core body 63 is withdrawn earlier than the side core bodies 66L, 66R, a part of the weather strip is unfixed. Therefore, when the side core bodies 66L, 66R are withdrawn, the deformation movement of the weather strip 1 with respect to the side core bodies 66L, 66R comes to be easily made. Accordingly, the withdrawing of the side core bodies 66L, 66R can also be done easily.

In addition, the projections 69 are provided on the inner lower mold 57. Therefore, the extension slit parts 40L, 40R, 41L, 41R are already formed when the withdrawing of the side core bodies 66L, 66R from the weather strip 1 is started. Accordingly, when the side extension plates 67L, 67R are inserted into the extension slit parts 40L, 40R, 41L, 41R, the weather strip 1 is slid easily with respect to the side core bodies 66L, 66R, and removed easily.

When the molded weather strip 1 is removed from the molding device 51, the core mold is not removed solely therefrom. This enables a fall of a core mold and damage to the molding device 51 to be prevented.

The slit 31 is molded in the base bottom portion 21 of the molded member 4. For example, when a slit is formed in the seal portion 23, the rigidity of the seal portion 23 is spoiled due to the slit, and the possibility of causing a decrease in the sealability of the seal portion occurs. In this embodiment, a decrease in the sealability of the seal portion can be prevented.

The rigidity of the portion of the base bottom portion in which the greatly openable center slit 33 is formed becomes lower than that of the portion thereof in which the side slits 32L, 32R are formed. Therefore, when the weather strip is fixed to a circumference of an opening, the shape follow-up characteristics thereof can be heightened even with respect to a curved portion, such as an upper corner portion of a door of an automobile. In the meantime, an extreme decrease in the rigidity can be held down owing to the existence of the bridge portion 34.

The center slit 33 is formed substantially in the H-shape or substantially in the U-shape. When the center slit 33 is substantially H-shaped, the stress concentration in the widthwise direction of the weather strip can be prevented. When the center slit is substantially U-shaped, the stress concentration is done conversely, i.e., in either of the widthwise directions. This enables the rigidity of the seal portion or lip to be secured.

Since the removal of the weather strip 1 from the molding device 51 is carried out easily as mentioned above, the work efficiency can be improved greatly.

Second Embodiment

The second embodiment will now be described by attaching importance to the differences between this embodiment and the first embodiment. A weather strip 101 is provided at a longitudinal end portion thereof with a molded member 104, which is connected at one end thereof to an extruded member 102 (refer to FIG. 10). The molded member 104 is formed substantially linearly unlike that of the first embodiment. As shown in FIGS. 11A and 11B, the extruded member 102 is provided with a base bottom portion 111, a hollow portion 112 extending from the base bottom portion 111 and a seal portion 113, and the molded member 104 also has a base bottom portion 121, a hollow portion 122 and a seal portion 123.

Figure 10:
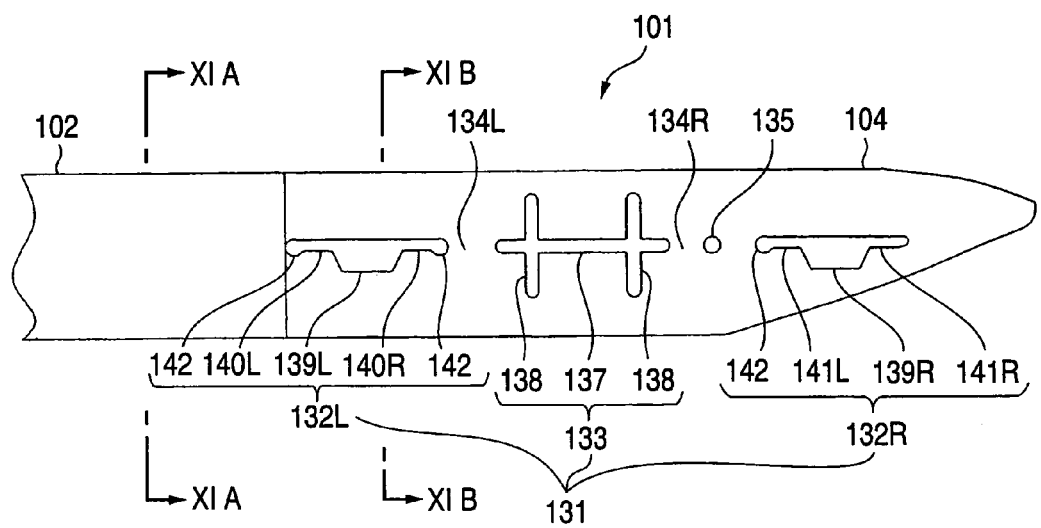
FIG. 10 is a schematic drawing describing a schematic construction of the weather strip of the second embodiment.
Figure 11A:
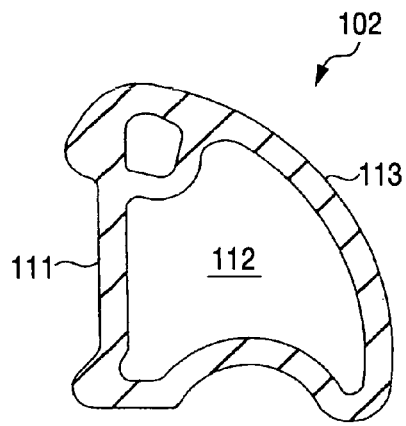
FIG. 11A is a sectional view taken along the line XIA-XIA in FIG. 10 and showing an extruded member.
Figure 11B:
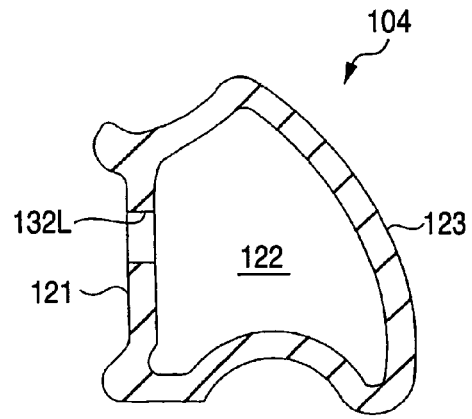
FIG. 11B is a sectional view taken along the line XIB-XIB and showing a molded member.

As shown in FIG. 10, the base bottom portion 121 of the molded member 104 is provided with two side slits 132L, 132R, a center slit 133, bridge portion 134L, 134R. In addition, the bridge portion 134R is provided with a clip hole 135 for engaging a clip (not shown) therewith.

The center slit 133 is provided with a long slit part 137 as a first slit part, and short slit parts 138 as second slit parts at substantially both ends (slightly on the inner side of both ends) of the long slit part 137. The side slits 132L, 132R are provided with main slit parts 139L, 139R, and extension slit parts 140L, 140R, 141L, 141R extending from both end of the main slit parts. At the end sides of the extension slit parts 140L, 140R, 141L, 141R, substantially circular slit end portions 142 are formed.

Figure 12:
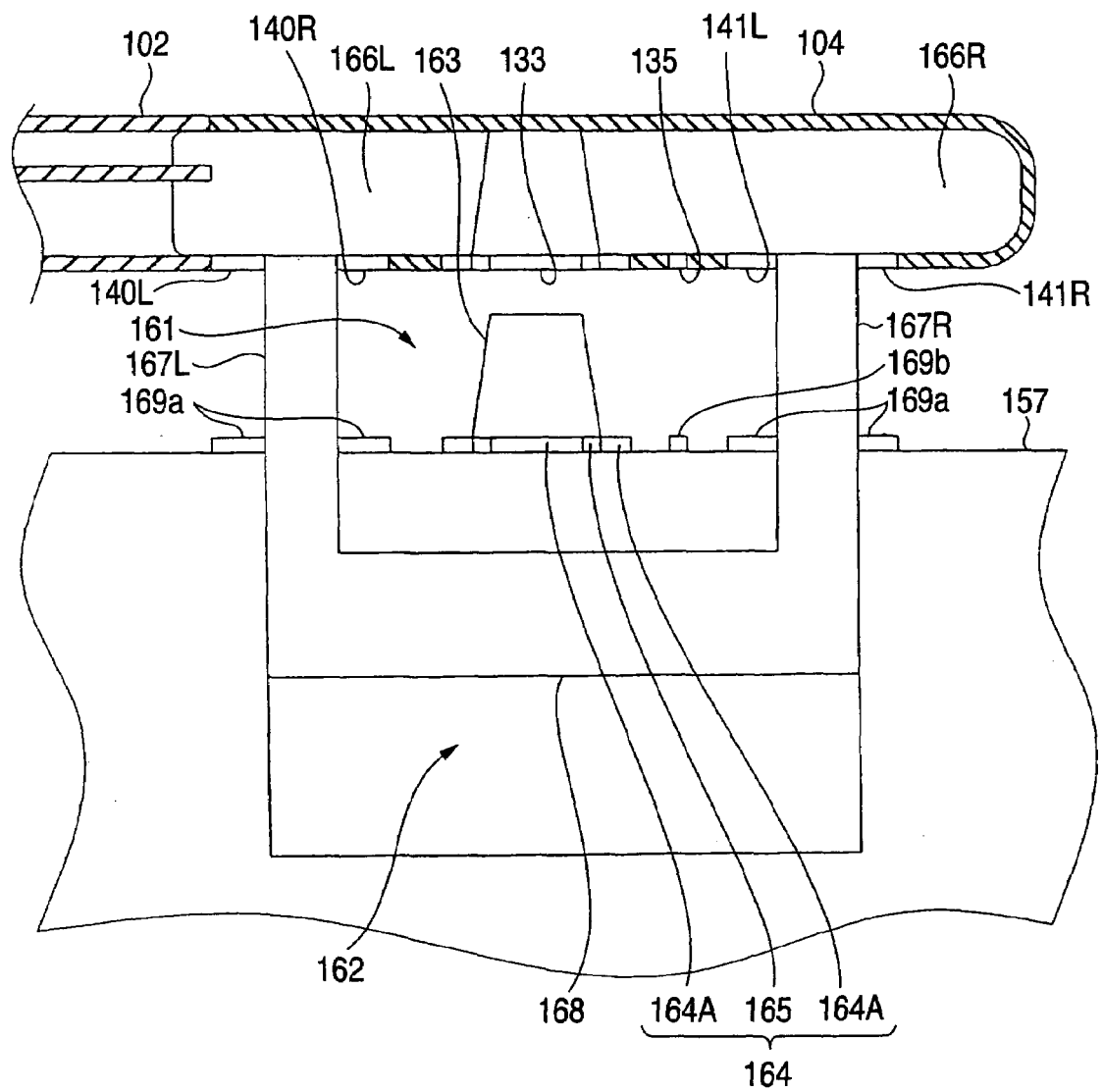
FIG. 12 is a drawing describing the removal of the weather strip from the molds in the second embodiment.

The core mold in a molding device for molding the molded member 104 will now be described on the basis of what are shown in FIG. 12. The core mold includes a center core 161, and a side core 162. The center core 161 includes a center core body 163, and a center extension plate 164, and is held between an inside upper inner-mold (not shown) and an inside lower inner-mold 157. The length in the longitudinal direction of the weather strip 101 of the center core body 163 is set slightly smaller than that of the thin portion 164A. At substantially both ends (on the slightly inner sides of both ends) of the thin portion 164A, orthogonal transverse piece portions 165 as transverse piece portion of the invention for forming the short slit parts 138 are formed in one body with the thin portion. The side core 162 includes two side core bodies 166L, 166R, side extension plates 167L, 167R, and a connecting portion 168. On a free end of the inside lower inner-mold 157, projections 169a for forming the extension slit parts 140L, 140R, 141L, 141R, and a pin 169b for forming the clip hole 135 are provided in one body with this mold.

A method of manufacturing the weather strip 101 and the operation and effects of the manufacturing of the weather strip will now be described. After the extruded member 102 is obtained, an end portion of the same member is fitted by a predetermined length with the molding device opened into the longitudinal end portion of the side core body 166L which does not face the center core 161, and set therein. The molding device is then closed, and a material is injected into a cavity (not shown) and solidified. After the material is solidified, the molds are opened in order.

In order to open the molds, the side core 162 is slid with the weather strip 101, and the center core body 163 in the hollow portion is removed from the center slit 133 automatically with ease. During this time, the projections 169a and pin 169b are also separated from the weather strip 101, so-that clearances due to the extension slit parts 140L, 140R, 141L, 141R, and the clip hole 135 come to be formed in the weather strip 101.

An operation for removing the molded member 104 from the side core bodies 166L, 166R is further carried out by the worker. The portion of the extruded member 102 which is in the vicinity of the joint portion of the molded member 104 is pulled to the left side of the drawing in the longitudinal direction of the left side core body 166L. As a result, the weather strip 101 is slid comparatively easily with respect to the side core 162 owing to the elasticity of the molded member 104 itself and owing to the existence of the extension slit parts 140R, 141R. The left side core body 166L is then removed in the same order as in the first embodiment. The right side core body 166R is also thereafter removed from the weather strip 101 as the elasticity of the molded member 104 and the provided extension slit parts 141L, 141R are utilized.

As described in detail above, the same operation and effects as in the first embodiment are displayed even in the second embodiment in which the molded member 104 is formed on an end portion of the weather strip 101.

The present invention is not limited to what are described in these modes of embodiments, and the invention may also be practiced, for example, in the following manner. Applied examples and modified examples which are other than the examples referred to above, and which will not be described in the following paragraphs, can also be practiced, of course.

(a) In the above-described first and second modes of embodiments, the center slits 33, 133 and side slits 32L, 32R, 132L, 132R are provided on substantially the same line but these slits may not necessarily be arranged on the same line.

(b) In the above-described first and second modes of embodiments, the length of the short slit parts 38, 138 are set substantially equal to the width of the surface on the side of the hollow portion 22, 122 in the base bottom portion 21, 121. The purpose is met as long as the center core body 63, 163 can be withdrawn from the center slit 33, 133, and the mentioned length is not limited to the mentioned level. For example, this length may be not smaller than ¾ of the width of the mentioned surface, and also not smaller than ⅔ or not smaller than ½ thereof.

(c) It is not necessary that the short slit parts 38, 138 be formed so as to cross the long slit part 137 at right angles thereto. For example, the short slit parts may be formed so as to diverge toward the side slits.

(d) The short slit parts 38, 138 are provided at substantially both end portions in the longitudinal direction of the long slit part 37, 137. The purpose is met as long as the center core body 63, 163 is withdrawn from the center slit 33, 133. The positions in which the short slit parts are provided are not limited to the mentioned positions. For example, one short slit part may be provided in a position in the vicinity of the long slit part 37, 137 so that the center slit as a whole substantially has a shape of a cross or a shape of the letter "T".

(e) The weather strip 1, 101 has a flexibility as mentioned above. Therefore, when the side core bodies 66L, 66R, 166L, 166R can be withdrawn from the weather strip 1, 101, the length of the extension slit parts 40L, 40R, 41L, 41R, 140L, 140R, 141L, 141R may be smaller than that of fitting portions of the side core bodies 66L, 66R, 166L.

(f) All of the extension slit parts 40L, 40R, 41L, 41R, 140L, 140R, 141L, 141R may not have the same sizes.

(g) The extension slit parts 40L, 40R, 41L, 41R, 140L, 140R, 141L, 141R are provided at both ends of the two side slits 32L, 32R, 132L, 132R, i.e., in four positions. These extension slit parts may not necessarily be provided in four positions. For example, these slit parts may be provided even in two positions on the side of the center slit 33, 133.

(h) The slit end portions 42, 142 may not be formed substantially circularly but maybe formed so as to extend in the widthwise direction of the weather strip 1, 101 in the same manner as the short slit parts 38, 138. This enables the side core bodies 66L, 66R, 166L, 166R to be withdrawn more easily from the weather strip 1, 101.

(i) In the above-described first and second modes of embodiments, the molding device 51 is formed so that, when the molds are opened, the side core 62, 162 is slid with the weather strip 1, 101 with respect to the inside upper inner-mold 56 and inside lower inner-mold 157. However, conversely, the mold may be formed so that the center core 61, 161, inside upper inner-mold 56 and inside lower inner-mold 57, 157 are slid with respect to the weather strip 1, 101 and side core 62, 162.

(j) A clip fixing hole may be provided in the bridge portion 34, 134L, 134R, and, when occasion demands, an insert may be provided (buried).

(k) The side core 62, 162 may be divided into left and right portions without being connected together by the connecting portion 68, 168.

(l) The weather strips 1, 101 in the above-described first and second modes of embodiments are not provided with an insert but, even when the insert is provided, any inconveniences may occur, of course.

(m) The order of removing the weather strip 1, 101 is not at all limited to those in the above-described embodiments. Namely, the weather strip can be removed in other order since the weather strip has a predetermined level of elasticity and owing to the existence of the extension slit parts 40L, 40R, 41L, 41R, 140L, 140R, 141L, 141R.

(n) The molded member can be applied to various kinds of shapes, such as a curved shape of a corner portion of a weather strip, and a substantially linear shape of the weather strip irrespective of the connecting condition of the molded member to (one end or both ends of) the extruded member.

What is claimed is:

1. A weather strip comprising:
a molded member including a base bottom portion, and a seal portion in which a hollow portion is formed, projecting from said base bottom portion, said base bottom portion being provided with at least three slits including a center slit, and two side slits formed on both sides of said center slit, so that bridge portions are formed between adjacent ones of said slits, and said center slit being provided with a first slit part, and second slit parts are formed substantially at both ends of the first slit part so that said second slit parts intersect with the first slit part, wherein said second slit parts intersect with said first slit part substantially at right angles, and said center slit as a whole is formed substantially in an H-shape or substantially in a U-shape.

2. A weather strip according to claim 1, wherein said molded member has a curved shape so that said molded member is fitted in an opening portion of a vehicle or a corner portion of a circumference of a door.

3. A weather strip according to claim 1, wherein said molded member is formed substantially linearly.

4. A weather strip according to claim 1, wherein the molded member has a two ends, and each of the ends of the molded member is connected to a separately formed extruded member.

5. A weather strip according to claim 1, wherein said molded member is connected to the end portion of separately formed extruded member to form a terminal portion of the weather strip.

* * * * *